(12) United States Patent
Brzozowski et al.

(10) Patent No.: US 10,587,512 B2
(45) Date of Patent: *Mar. 10, 2020

(54) STATELESS PROTOCOL TRANSLATION

(71) Applicant: Comcast Cable Communications, LLC, Philadelphia, PA (US)

(72) Inventors: John Jason Brzozowski, Schwenksville, PA (US); Joseph Pryszlak, Lafayette Hill, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,018

(22) Filed: May 8, 2017

(65) Prior Publication Data
US 2018/0026888 A1 Jan. 25, 2018

Related U.S. Application Data

(63) Continuation of application No. 14/641,960, filed on Mar. 9, 2015, now Pat. No. 9,680,744, which is a
(Continued)

(51) Int. Cl.
*H04L 12/749* (2013.01)
*H04L 29/12* (2006.01)
(Continued)

(52) U.S. Cl.
CPC .......... *H04L 45/741* (2013.01); *H04L 45/00* (2013.01); *H04L 45/745* (2013.01); *H04L 49/3009* (2013.01); *H04L 61/1511* (2013.01); *H04L 61/251* (2013.01); *H04L 61/2557* (2013.01); *H04L 61/2575* (2013.01); *H04L 69/08* (2013.01); *H04L 61/2076* (2013.01); *H04L 69/16* (2013.01)

(58) Field of Classification Search
CPC . H04L 45/745; H04L 47/125; H04L 61/6059; H04L 12/56; H04L 69/16; H04L 69/167
See application file for complete search history.

(56) References Cited

U.S. PATENT DOCUMENTS 7,583,698 B2   9/2009   Higuchi et al.
8,179,888 B2   5/2012   Chen et al.
(Continued)

OTHER PUBLICATIONS

Nordmark, E. "Stateless IP/ICMP Translation Algorithm (SIIT)", Feb. 2000, RFC 2765.
(Continued)

*Primary Examiner* — Raj Jain
(74) *Attorney, Agent, or Firm* — Banner & Witcoff, Ltd.

(57) ABSTRACT

Some aspects of the methods and systems presented relate to performing stateless address translation between IPv4 capable devices to IPv6 capable networks and devices. Stateless address translation may form a new IPv6 addresses by combining the IPv4 address of a device with an IPv6 prefix address assigned to the translator. The translation may also combine the IPv4 destination address and UDP port information with the new IPv6 address. Existing Domain Name Systems (DNSs) may be leveraged for resolving the IPv4 and IPv6 addresses across different networks.

20 Claims, 9 Drawing Sheets

Related U.S. Application Data continuation of application No. 13/417,676, filed on Mar. 12, 2012, now Pat. No. 9,008,093.

(51) Int. Cl.
*H04L 12/741* (2013.01)
*H04L 12/935* (2013.01)
*H04L 29/06* (2006.01)
*H04L 12/701* (2013.01)

(56) References Cited

U.S. PATENT DOCUMENTS

| | | | |
|---|---|---|---|
| 8,266,428 B2 | 9/2012 | Kwon et al. | |
| 8,484,666 B2 | 7/2013 | Berezansky et al. | |
| 8,544,079 B2* | 9/2013 | Kivinen | H04L 12/4633 726/14 |
| 9,680,744 B2* | 6/2017 | Brzozowski | H04L 69/08 |
| 2003/0101275 A1 | 5/2003 | Maciel | |
| 2004/0125813 A1 | 7/2004 | Tanaka et al. | |
| 2004/0240468 A1* | 12/2004 | Chin | H04L 29/12066 370/466 |
| 2005/0015507 A1 | 1/2005 | Chin | |
| 2006/0140213 A1* | 6/2006 | Hwang | H04L 12/18 370/466 |
| 2007/0081512 A1 | 4/2007 | Takeda et al. | |
| 2007/0201356 A1 | 8/2007 | Liao et al. | |
| 2010/0157799 A1* | 6/2010 | Nice | H04L 45/745 370/235 |
| 2011/0173304 A1* | 7/2011 | Schlack | H04L 65/4084 709/220 |
| 2013/0235862 A1* | 9/2013 | Kahng | H04L 61/6072 370/338 |
| 2015/0281069 A1* | 10/2015 | Brzozowski | H04L 69/08 370/392 |

OTHER PUBLICATIONS

Tsirtsis G. "Network Address Translation—Protocol Translation (NAT-PT)", Feb. 2000, RFC 2766.

Nichols, et al., Definition of the Differentiated Services Field (DS Field) in the IPv4 and IPv6 Headers, RFC 2474, Dec. 1998, 20 pages.

Deering, et al., "Internet Protocol, Version 6 (IPv6) Specification", RFC 2460, Dec. 1998, 39 pages.

Braden, "Requirements for Internet Hosts—Communication Layers", RFC 1122, Oct. 1989, 117 pages.

Postel, "User Datagram Protocol", RFC 768, Aug. 28, 1980, 4 pages.

Information Sciences Institute, "Internet Protocol, DARPA Internet Program Protocol Specification", RFC 791, Sep. 1981, 51 pages.

\* cited by examiner

STATELESS PROTOCOL TRANSLATION

CROSS REFERENCE TO RELATED APPLICATION

The present application is a continuation of U.S. patent application Ser. No. 14/641,960, filed Mar. 9, 2015 and entitled "Stateless Protocol Translation," which is a continuation of U.S. patent application Ser. No. 13/417,676, filed on Mar. 12, 2012 and entitled "Stateless Protocol Translation," each of which is incorporated by reference herein.

FIELD

Aspects of the disclosure relate to supporting two or more communication protocols simultaneously in a computer network. Some aspects relate to stateless translation from a legacy protocol, such as Internet Protocol version 4 (IPv4), to a newer protocol such as Internet Protocol version 6 (IPv6).

BACKGROUND

In an Internet Protocol (IP) network, connected devices may be assigned an IP address for identifying a device's communications over the network. Legacy networks and devices may utilize Internet Protocol version 4 (IPv4) addressing, which includes a dotted decimal format IP address field. The IPv4 address contains four numbers, each ranging from 0 to 255 in decimal format (e.g. 10.1.322.65), which provide a maximum of 4,294,967,296 possible addresses. With the growth in a network's size and in the number of devices connected to the network, unassigned IPv4 addresses available for use by new devices may reach a critical level.

One solution for dealing with this problem has been to divide a network into smaller local networks, each using its own isolated IPv4 address space. Within a local network, communications may be routed unfettered between devices within the local network, because each connected device is identified with a unique IP address. However, devices in different local networks may have the same IP address, and thus communications across the different local networks (e.g., in the global network) may require special handling to avoid communications being routed to the wrong device. One solution to handle global routing is to use network address translation (NAT) for messages routed between local networks.

With NAT, multiple devices on a local (e.g., internal) network look like a single IPv4 address to devices on other local (e.g., external) networks. Devices on an internal network behind a NAT device may each have an internal IPv4 address that is only used on the internal network. When one of these devices transmits packets outside of the internal network, the NAT device modifies the packets to replace the device's internal (e.g., local) IPv4 address with an external (global) IPv4 address. The external IPv4 address is shared by the entire internal network such that all packets sent from devices in the internal network to the external network appear to come from the NAT device itself, which has been assigned the external IPv4 address on the external network. In reply to these outbound packets with the external IPv4 address, inbound packets received from the external networks will likewise be addressed to the shared external IPv4 address. The NAT device keeps track of which device originally transmitted outbound packets to form an address mapping so that inbound packets can be reverse translated, replacing the external IPv4 address with the correct corresponding internal IPv4 address. The NAT device then forwards the translated inbound packets to the correct device. The address mapping by a NAT device may be referred to as stateful translation, because the NAT device must store the status of communications and other information in memory to perform the reverse translation and route the inbound packets to the correct device on the internal network. While NAT is useful, NAT schemes may not scale well for large network environments. As a network grows, NAT devices are required to perform an increasing number of address mappings to support an increasing number of transactions. However, hardware and memory are limited in size. Further, with the increase in memory size, comes a decrease in memory speed. The size and speed limits impose a practical limit on the number of address mappings a NAT device can perform efficiently.

BRIEF SUMMARY

This Summary is provided to introduce a selection of concepts in a simplified form that are further described below in the Detailed Description. This Summary is not intended to identify key features or essential features.

IPv6 is another IP addressing scheme intended as a successor to IPv4. IPv6 provides approximately $3.4 \times 10^{38}$ addresses, which are $7.9 \times 10^{28}$ times as many addresses provided for by the IPv4 standard. While IPv6 has been developed, in part, to replace IPv4 and alleviate the IPv4 address exhaustion problem, in many networks, both IPv4 and IPv6 coexist while IPv6 is phased in over time.

Various illustrative embodiments are presented that overcome the scalability issue of NAT and simplify legacy (e.g., IPv4) device support with processes to perform stateless address translation between legacy (e.g., IPv4) only capable devices to new (e.g., IPv6) protocol capable networks and devices. These processes may be performed by one or more legacy/new (e.g., Ipv4/IPv6) protocol stateless translators deployed within one or more networks. Various illustrative embodiments include algorithms to discover stateless translator locations within a network and to perform simplified translation of IP/UDP originated legacy (e.g., IPv4) packets.

Various embodiments for performing stateless legacy/new (e.g., Ipv4/IPv6) protocol translation embed the source legacy (e.g., IPv4) address of a message into the source new (e.g., IPv6) address used by the translator. Other variations may also embed the legacy (e.g., IPv4) destination address of the message within the new (e.g., IPv6) source address. Further embodiments embed legacy (e.g., IPv4) port information within the new (e.g., IPv6) packet.

To perform the translation, certain embodiments may perform a reverse DNS lookup of the legacy (e.g., IPv4) destination address to determine a domain name of the destination device, and then perform a DNS lookup of the domain name to determine the new (e.g., IPv6) destination address. Variations may also support dynamic DNS lookup.

Various embodiments include deploying the stateless legacy/new protocol (e.g., Ipv4/IPv6) translator in legacy (e.g., IPv4) only networks. In such embodiments, translated new (e.g., IPv6) messages may be routed using tunneling from the legacy (e.g., IPv4) capable network to an IPv6 capable network.

Various other embodiments include stateless IPv4/IPv6 translation in a video distribution network for supporting communication between legacy (e.g., IPv4) capable set top boxes and new (e.g., IPv6) protocol capable video-on-demand servers.

Other various embodiments include apparatus, systems, methods, and computer readable memory storing machine executable instructions for performing the functions of the embodiments described above, and further described below.

BRIEF DESCRIPTION OF THE DRAWINGS

Some embodiments are illustrated by way of example, and not by way of limitation, in the figures of the accompanying drawings and in which like reference numerals refer to similar elements. For convenience, the first portion of each reference numeral corresponds to the drawing figure in which the referenced drawing element is first introduced.

DETAILED DESCRIPTION

Figure 1A:
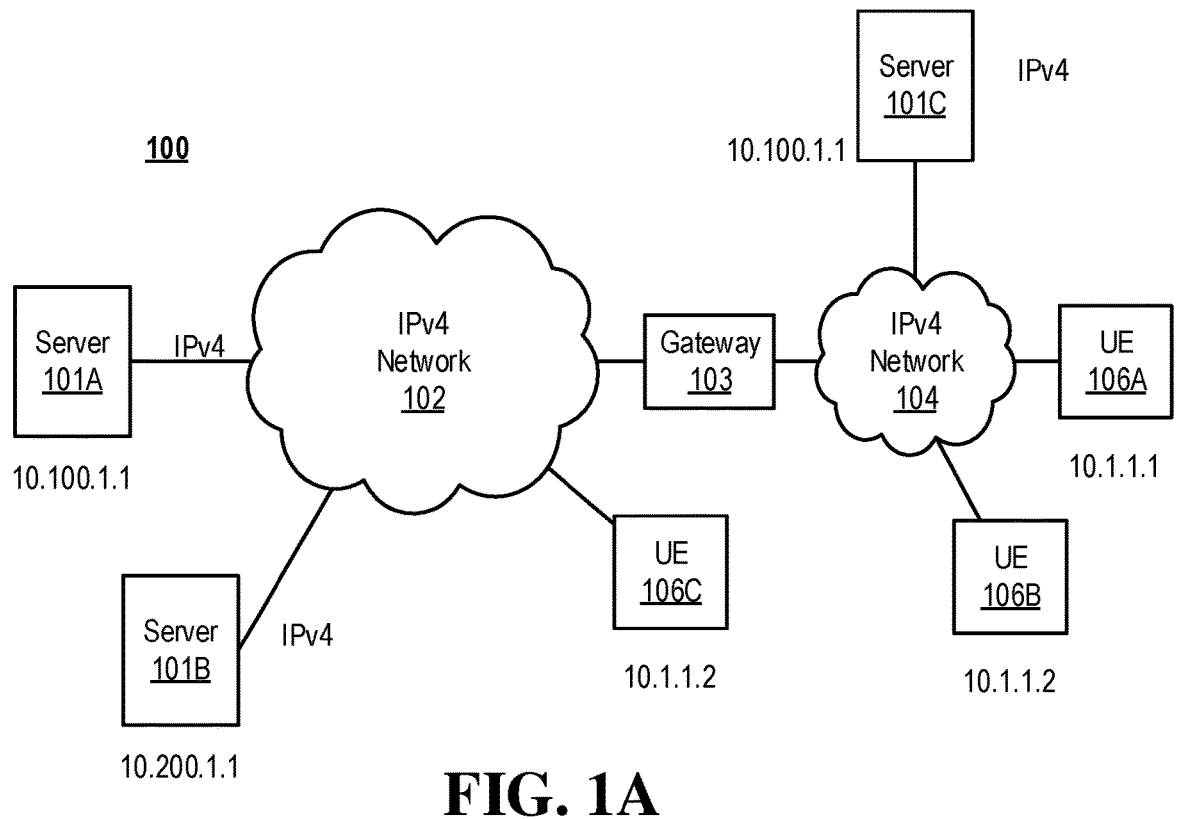
FIG. 1A illustrates an example block diagram of an IPv4 Internet Protocol network in accordance with one or more embodiments of the disclosure.

FIG. 1A illustrates an example block diagram of an IPv4 Internet Protocol global network 100. Global network 100 may include local networks 102, 104, and other local networks (not shown) interconnected through one or more communication devices such as gateway 103. Computing devices, such as servers 101A-C, user equipment 106A-C (e.g., any user device), and other devices may be communicatively connected to the local networks and may communicate data across the global network between the devices. Each device connected to the networks may have an Internet Protocol version 4 (IPv4) address assigned to it to identify data messages communicated to and from the device. A device's IPv4 address may include four numbers, each ranging from 0 to 255 (e.g. 10.1.1.1). Each device in FIG. 1A includes an IPv4 address, which is illustrated next to the device.

Figure 1B:
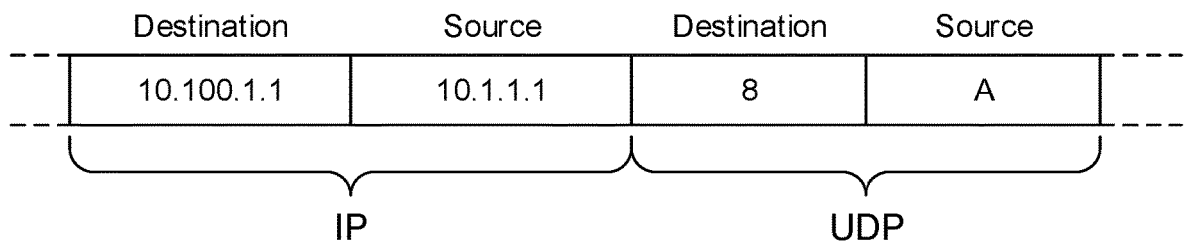
FIG. 1B illustrates a portion of an IPv4 packet header data structure in accordance with one or more embodiments of the disclosure.

The data messages may be formatted into IPv4 packets which include a header, a portion of which is illustrated in FIG. 1B. The IPv4 header may include a destination field and a source field, which include the IPv4 addresses of the device intended to receive the packet and the device sending the packet respectively. For example, the IPv4 packet illustrated in FIG. 1B could be a message sent from either Server 101A or 101C (both have the same IPv4 address) to UE 106A. In some examples, the IPv4 header may also include a User Datagram Protocol section, which includes source and destination fields, which include port numbers for the device sending the packet and the device intended to receive the packet respectively. A port on the device refers to a logical (e.g., software) endpoint for different data services on each device. The combination of a device's IP address and UDP port number form a datagram socket.

One example of UDP/IP for IPv4 is more fully described in IETF publication RFC 1122 and consists of a communication protocol stack of four layers: the Link Layer, Internet Layer, Transport Layer, and Application layer. At the Internet Layer, IPv4 may be described in IETF publication RFC 791. At the Transport Layer, UDP may be described in IETF publication RFC 768.

In some examples within a local network (e.g., network 104), communications may be routed internally between devices unfettered (e.g., between UE 106A and server 101C), because each connected device is identified with a unique IP address. However, across local networks, devices may have the same IP address (e.g., servers 101a and 101c), and thus communications between local networks (e.g., in the global network) may require special handling to avoid communications being routed to the wrong device. To address this issue, in some examples, Network address translation (NAT) may be used for messages routed between local networks. NAT may be implemented, for example, by gateway 103. While NAT is useful, as discussed above, NAT schemes may not scale well for large network environments.

Internet Protocol version 6 (IPv6) is another example IP addressing scheme. IPv6 provides approximately $3.4 \times 10^{38}$ addresses, which are $7.9 \times 10^{28}$ times as many addresses provided for by the IPv4 standard. While IPv6 has been developed, in part, to replace IPv4 and alleviate the IPv4 address exhaustion problem, in many networks, both IPv4 and IPv6 addressing coexist while IPv6 is phased in over time. An example of an IPv6 protocol is more fully described in IETF publication RFC 2460.

Figure 2A:
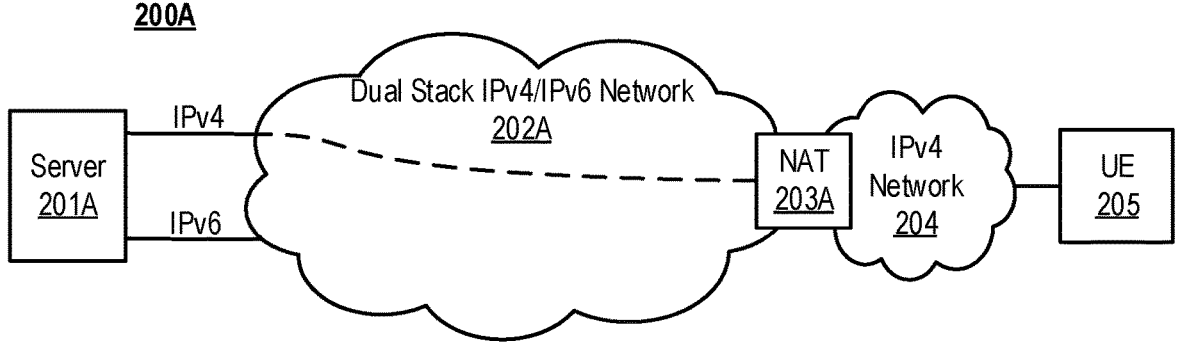
FIGS. 2A-2C illustrate example network backbones in accordance with one or more embodiments of the disclosure.
Figure 2B:
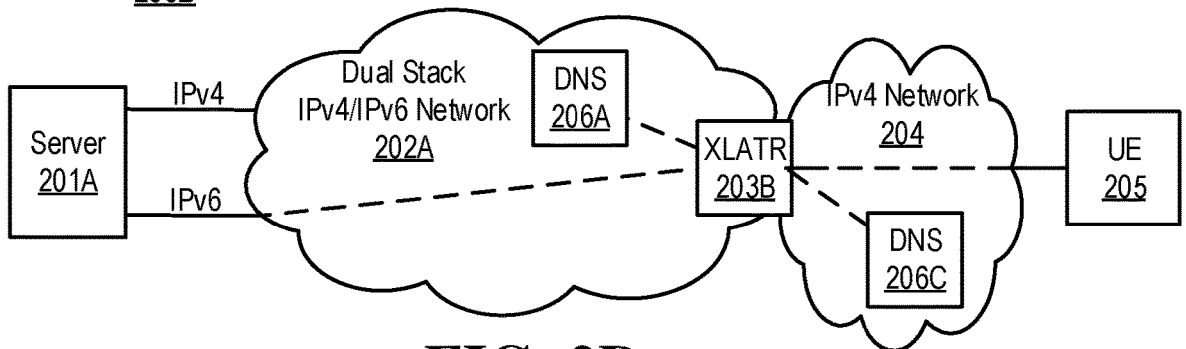
Figure 2C:
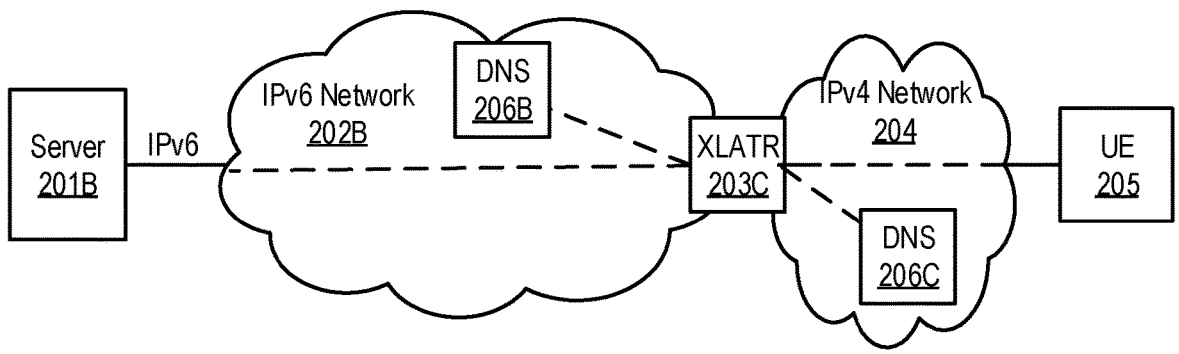

FIGS. 2A, 2B, and 2C illustrate various illustrative embodiments in which a network backbone has been upgraded to support IPv6 or other new protocol, but legacy local networks remain deployed. One example of such a network is a video-on-demand network, where the network backbone includes a video server back office, Server's 201A and 201B are video servers of the back-office and one or more example UE 205 may include set top boxes, digital terminal adaptors, personal computers, mobile devices and other equipment configured for receiving and viewing videos. The user equipment 205 may be connected through, for example, a hybrid fiber-coaxial cable network 204, or other network, via one or more network controllers, such as, for example, the NC1500 controller built by Motorola™. Network 204 may include various network controllers and/or various routers, which support IPv4 only, or other legacy protocol. While one network 204 and one UE 205 are illustrated, the global network 200A may include multiple IPv4 networks 204, each connecting multiple UE 205, each connected to network 202A through a respective gateway 203A. Further, network 202A and network 204 may each include multiple local/sub networks.

In FIG. 2A, the network backbone may include a network 202A and one or more servers 201A, which have been upgraded with dual stack legacy/new protocol (e.g., Ipv4/IPv6) equipment, which fully supports both legacy and new Internet protocols (e.g., IPv4 and IPv6) simultaneously. "Dual stack" refers to the fact that such networks and devices implement two complete communication protocol stacks for legacy and new Internet protocols simultaneously (e.g., IPv4 and IPv6 respectively). The dual stack network and servers may permit the expansion of services to new user equipment and upgrading of current equipment, taking advantage of the larger address space of IPv6 or other new Internet protocol. In some examples, while IPv6 continues to be deployed, legacy (e.g., IPv4) protocol and network address translation (NAT) may remain to serve legacy IPv4 local networks and equipment (e.g., network 204 and one or more UE 205). NAT may for example be performed by gateway 203A, which connects network 202A with network 204.

FIG. 2B illustrates an example embodiment including the same networks shown in FIG. 2A, except that network address translation has been replaced or augmented with an example legacy/new protocol (e.g., Ipv4/IPv6) stateless translation using translator (XLATR) 203B. Using stateless translator 203B, IP packets sent from network 204 in IPv4 format (or other legacy protocol) are translated to native IPv6 packets (or other new protocol) for forwarding to devices in network 202A, with each legacy (e.g., IPv4) address replaced by a unique new (e.g., IPv6) address. Similarly, new (e.g., IPv6) packets sent from network 202A are translated into legacy (e.g., IPv4) packets for forwarding to devices in network 204, with each new (e.g., IPv6) address replaced by a unique legacy (e.g., IPv4) address. Recall that network address translator 203A was required to store state information in order to route packets correctly. In contrast, as further described below, translator 203B need not store state information to correctly route packets. In some embodiments, translator 203B may query a domain name system (DNS) 206A present in network 202A and/or domain name system 206C in network 204 to determine correct source and destination addresses in IPv6 and IPv4 formats (or other new and legacy formats).

FIG. 2C includes an example embodiment similar to FIG. 2B, except that the dual stack IPV/IPv6 network 202A is replaced with a new (e.g., IPv6) only network 202B. Dual stack server 201A and DNS 206A have also been replaced by a new (e.g., IPv6) only server 201B and DNS 206B. In FIG. 2C, DNS 206B may include, for example, only new (e.g., IPv6) records. Accordingly translator (XLATR) 203C may, for example, access DNS 206C to retrieve correct IPv4 addresses.

The stateless translation illustrated in FIGS. 2B and 2C, and as further described below, may provide a more scalable solution than NAT, because increasing memory size and speed are not factors in expanding the network, and because already deployed DNSs may be utilized.

Figure 3:
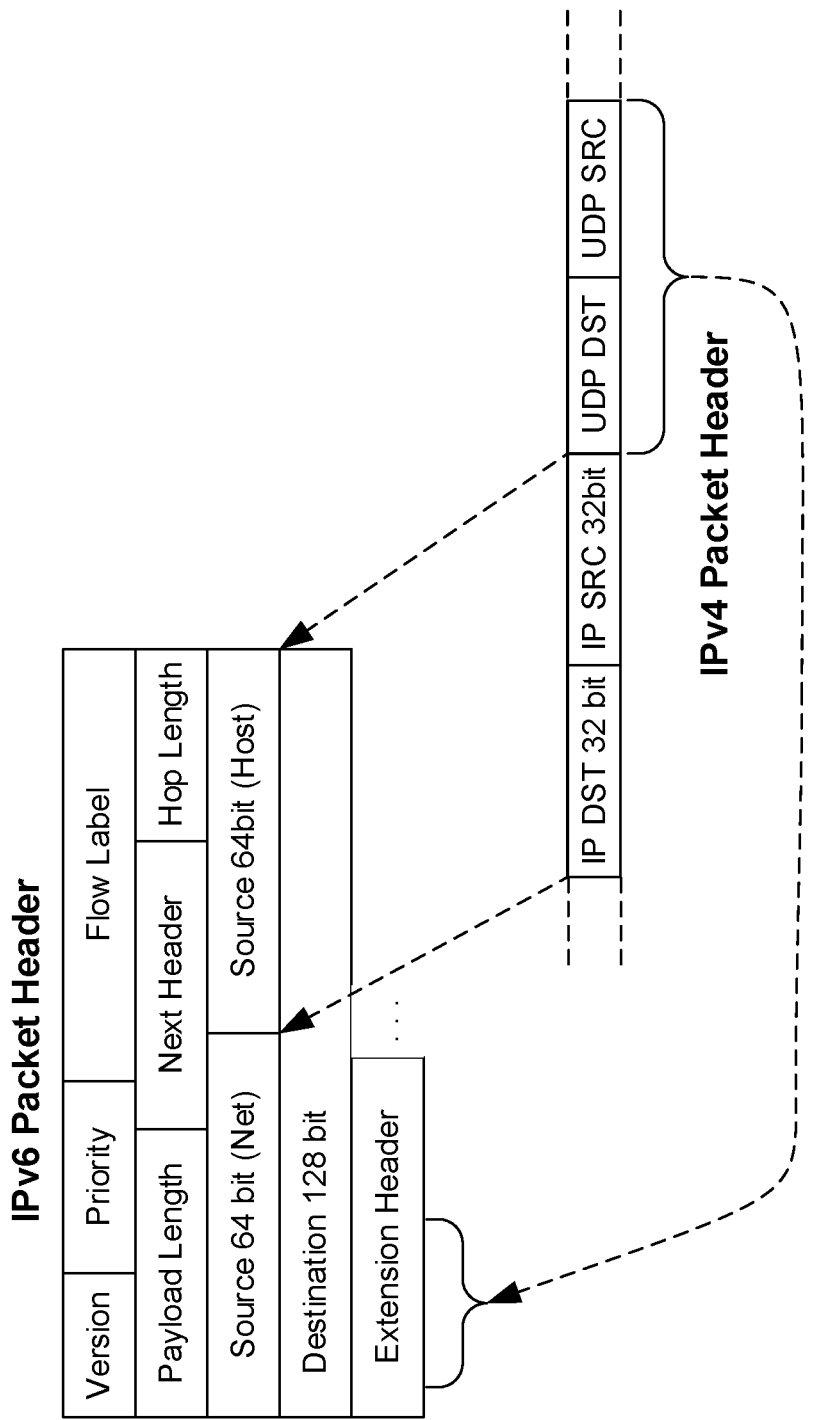
FIG. 3 illustrates one example for stateless IPv4 to IPv6 packet translation in accordance with one or more embodiments of the disclosure.

FIG. 3 illustrates one embodiment of how stateless legacy to new (e.g., IPv4 to IPv6) packet translation may be performed. FIG. 3 illustrates an example IPv6 packet header and a portion of an example IPv4 packet header including the IP destination and source addresses and UDP destination and source ports. In one example, the IPv6 header may include a four bit version field that may contain the number 6, an 8-bit priority (or traffic class) field that may include a differentiated services code (DSCP), a 20 bit flow label field for identifying a set of packets in the same flow, a 16-bit payload length identifying the length of the packet in bytes, an 8-bit next header field identifying the type of header following the IPv6 header in the packet, and an 8-bit hop limit field that is decremented at each router node as the packet traverses the network. Like the IPv4 header, the IPv6 header may include a source address and destination address for the packet. Each source and destination address in the IPv6 header may be 128 bits long. These addresses may be displayed as eight fields separated by colons, each field ranging from 0 to FFFF in hexadecimal format (e.g., 2001:100:0:0:10:1:5A5A:90). A sequential string of zeros may be abbreviated with double colons "::" (e.g., 2001:100::10:1:5A5A:90). In some variations, the 128 field may be partitioned into two 64-bit fields, with the high 64 bits comprising a network prefix (e.g., 2001:100:0:0), and the low 64 bits comprising a subnet mask (e.g., 10:1:5A5A:90). The example partitions are illustrated in FIG. 3 as Source 64 bit (Net) and Source 64 bit (Host), respectively. Although not displayed as such, the destination address in FIG. 3 may be similarly partitioned.

The IPv6 packet header may further contain, for example, an extension header, such as a UDP header, which may be identified by the Next Header Field. The Next Header field may include different defined codes for different extension header types. For example, a UDP header may have a Next Header field value of 17 decimal.

In various illustrative embodiments, legacy (e.g., IPv4) packets received by the stateless translator from a legacy device may be translated from the legacy (e.g., IPv4) packet to a new (e.g., IPv6) packet by embedding the legacy source and destination addresses and UDP source and destination addresses in the translated new (e.g., IPv6) packet header. In one illustrative embodiment, the 64 bit source network prefix in the new (e.g., IPv6) packet is assigned an address unique to the stateless translator, and the destination and source legacy (e.g., IPv4) addresses are embedded in the lower 64 bits of the new (e.g., IPv6) source address. Alternatively, in another illustrative embodiment, the legacy (e.g., IPv4) destination address is replaced with zeros in the new (e.g., IPv6) source address. In certain variations, the UDP destination and source addresses from the legacy (e.g., IPv4) packet are embedded in the extension header. The next header field may be set to 17 to indicate that the extension header is a UDP header.

In other variations, new (e.g., IPv6) packets received by the stateless translator from an new (e.g., IPv6) device may have the same format as shown in FIG. 3 and as described above, except that the source and destination IP addresses are swapped, such that the destination address includes the embedded legacy (e.g., IPv4) fields.

Figure 4:
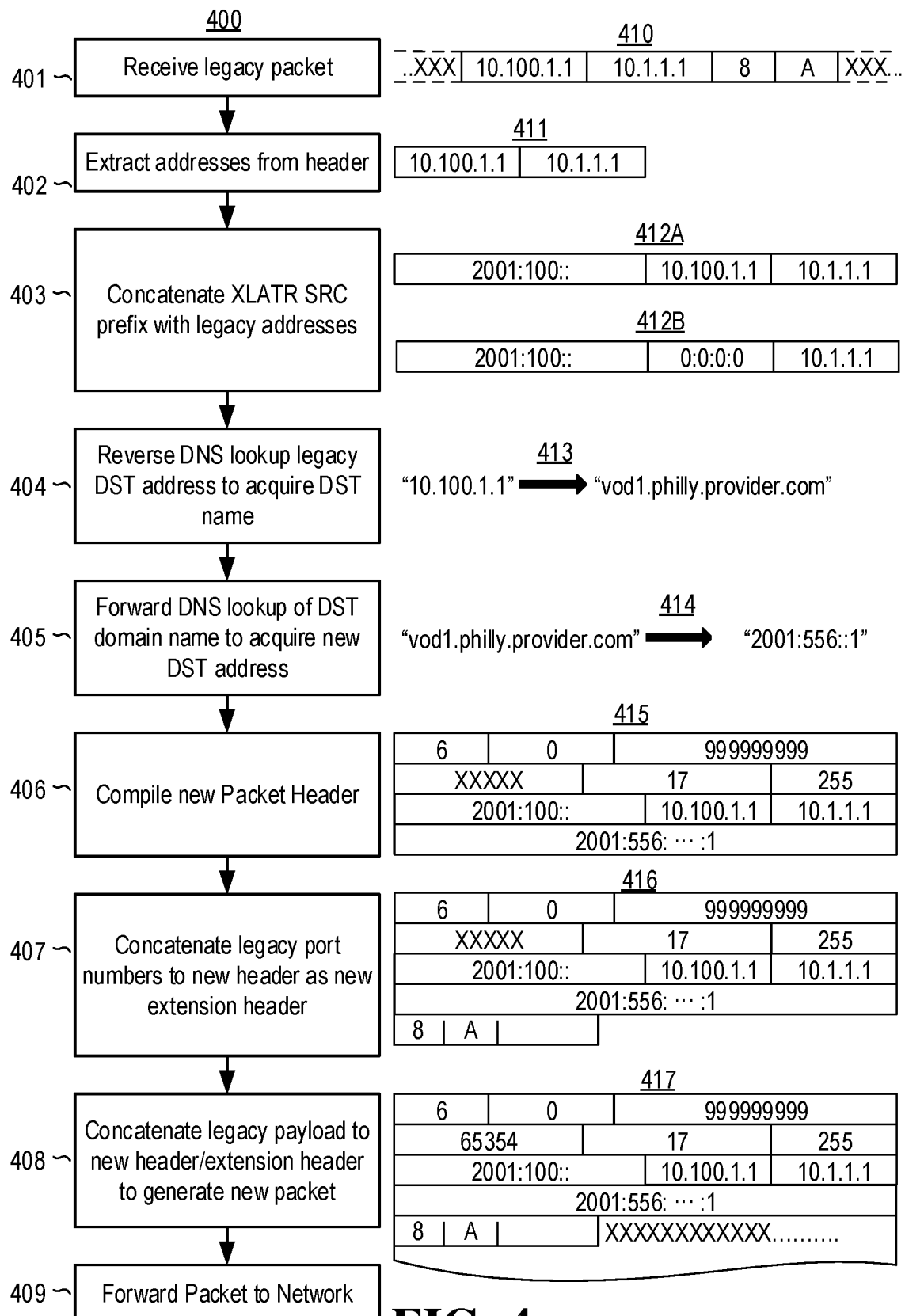
FIG. 4 illustrates an example flow chart for supporting IPv4 to IPv6 stateless translation in accordance with one or more embodiments of the disclosure.

FIG. 4 illustrates an example process flow 400 of at least one illustrative embodiment for supporting legacy (e.g., IPv4) to new (e.g., IPv6) stateless translation. The process begins at step 401 where the stateless translator (e.g., 203B) receives a legacy (e.g., IPv4) packet from a source device (e.g., 205). The IP and UDP address portions of the legacy (e.g., IPv4) packet may be as illustrated in data representation 410. In step 402, the legacy (e.g., IPv4) destination and source address are extracted from the legacy (e.g., IPv4) header. These may be as illustrated, for example, in data representation 411, with the destination address being 10.100.1.1 and the source address being 10.1.1.1. The destination address may be, for example, the legacy (e.g., IPv4) address assigned to server 201A or 201B, and the source address may be, for example, the legacy (e.g., IPv4) address assigned to user equipment 205. Note that the scope of both of these addresses may be limited to only the legacy (e.g., IPv4) network on which the sending device is connected. For example, the legacy (e.g., IPv4) address of server 201A within network 204 may be different from the legacy (e.g., IPv4) address of server 201A within network 202A. As another example, server 201A may not have a legacy (e.g., IPv4) address within network 202B.

In step 403, the stateless translator concatenates its own new (e.g., IPv6) prefix address (e.g., 64 bit) with the legacy (e.g., IPv4) destination and source address extracted in step 402. The concatenated data may be, for example, as illustrated in data representation 412A, which forms a complete source address for the translated new (e.g., IPv6) packet. Note that the new (e.g., IPv6) network prefix is illustrated in standard IPv6 hexadecimal form, while the embedded legacy (e.g., IPv4) addresses are maintained in dot-decimal form for clarity. In some variations, the new (e.g., IPv6) prefix may be shorter or longer than 64 bits (e.g., 32 bits, 96 bits). In one embodiment, a 96 bit new (e.g., IPv6) prefix address may be concatenated with only the legacy (e.g., IPv4) source address extracted in step 402. In other variations, the legacy (e.g., IPv4) prefix may be concatenated with 32 zeros and the legacy (e.g., IPv4) source address as illustrated in 412B.

In steps 404 and 405, a translator determines the correct new (e.g., IPv6) destination address from the legacy (e.g., IPv4) destination address through a two-step DNS lookup. In step 404, the translator performs a reverse DNS lookup of the legacy (e.g., IPv4) destination address to acquire the destination domain name (e.g., vod1.philly.provider.com). One example of a reverse DNS lookup is illustrated in 413. The reverse DNS lookup may be queried from a DNS having lookup tables populated with data that maps to the same legacy (e.g., IPv4) network address space where the source device is located, so that the correct domain name for the destination is retrieved. The DNS may for example be 206C in legacy (e.g., IPv4) network 204. Additionally or alternatively a DNS may be, for example, DNS 206A if the legacy (e.g., IPv4) destination address is a global address that is unique across both networks 202A and 204. A reverse DNS lookup query may also include other information identifying the destination, such as UDP destination port.

In step 405, a quad-A record ("AAAA") DNS lookup of the destination domain name retrieved in step 404 may be performed to acquire the new (e.g., IPv6) destination address. The quad-A DNS lookup query may be to a DNS populated with data that maps to the new (e.g., IPv6) destination network address space (e.g. 206A, 206B).

With the new (e.g., IPv6) source and destination addresses acquired in steps 403-405, the new (e.g., IPv6) packet header is compiled in step 406. An illustrative representation of this new (e.g., IPv6) packet header is illustrated in 415. In step 407, the UDP destination and source port numbers from the legacy (e.g., IPv4) packet are extracted and appended to a new (e.g., IPv6) header to form the new (e.g., IPv6) UDP extension header illustrated in 416. The format for the UDP extension header may be, for example, as defined in RFC 768. In the new (e.g., IPv6) header, the next header field may be set to identify the format of the extension header (e.g., decimal 17 for UDP extension headers).

In step 408, the data payload may be extracted from the legacy (e.g., IPv4) packet and appended to the header information illustrated in 416 to form a complete new (e.g., IPv6) packet. In the new (e.g., IPv6) header, the payload length field may be determined and included in the header based on the appended payload data. Other data, such as checksum information and UDP length included in the UDP header may also be calculated and inserted into the extension header.

Step 408 may include adding other header data from the IPv4 packet to the IPv6 header. One example may be to copy Quality of Service data from the IPv4 header to the IPv6 header. One example of such data may include a Differentiate Services (DS) Field, which may be defined for both IPv4 and IPv6 protocols in IETF publication RFC 2474. The DS field may include a Data Services Code Point (DSCP) field. In various examples, the IPv4 packet may include the DS field in the Type of Service (TOS) location, which may be the second byte of the header (not shown). The entire DS field, or a portion thereof (e.g., the DSCP field), may be copied and included in the IPv6 packet header. In various examples, the copied field may be included in the Priority (i.e., Traffic Class) field in the IPv6 header illustrated in FIG. 3.

Process 400 is completed at step 409 with the complete new (e.g., IPv6) packet being forwarded through the new (e.g., IPv6) compatible network to the destination device (e.g., server 201A).

Figure 5:
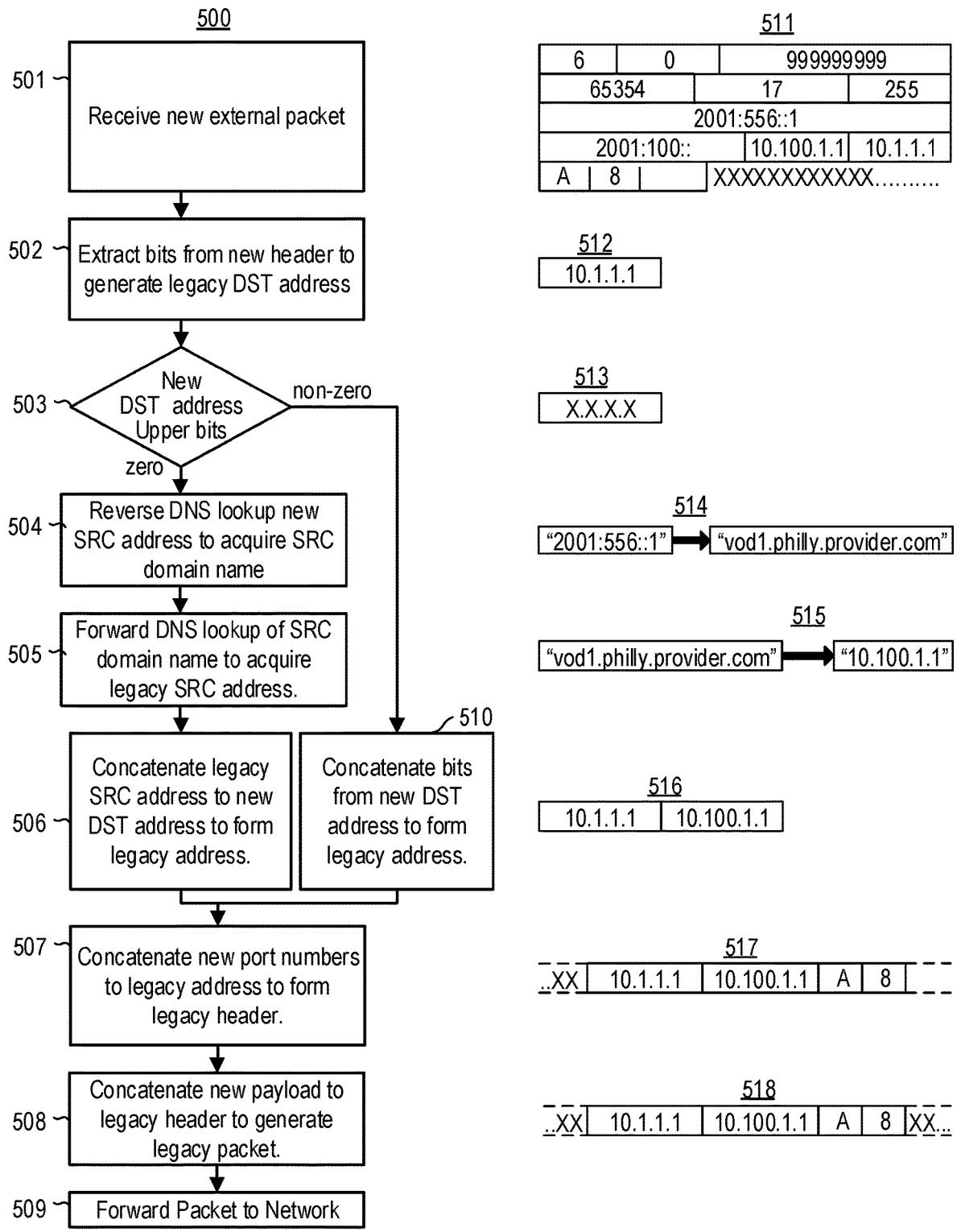
FIG. 5 illustrates an example flow chart for supporting IPv6 to IPv4 stateless translation in accordance with one or more embodiments of the disclosure.

FIG. 5 illustrates an example process flow 500 of at least one illustrative embodiment for supporting new (e.g., IPv6) to legacy (e.g., IPv4) stateless translation. The process begins at step 501 where the stateless translator receives a new (e.g., IPv6) packet from a new (e.g., IPv6) source device over the new (e.g., IPv6) or dual stack network. An illustrative new (e.g., IPv6) packet is illustrated in 511. If this packet is in reply to the new (e.g., IPv6) packet sent in step 409 of process 400, the source and destination IP addresses and UDP ports may be reversed from those in the new (e.g., IPv6) packet 417 sent in process 400. In this scenario, the lower bits (e.g., 64 bits) of the destination address may, in some examples, match the destination and source addresses in the original legacy (e.g., IPv4) packet sent from the legacy (e.g., IPv4) source device in process 400. If the new (e.g., IPv6) packet is not in reply to the new (e.g., IPv6) packet sent in process 400, the new (e.g., IPv6) sending device may generate the new (e.g., IPv6) destination address by using a DNS lookup with dynamic DNS support as further described below.

In step 502, the lower bits (e.g., lower 32 bits) of the new (e.g., IPv6) destination address (i.e., bits 32:1) may be extracted from the new (e.g., IPv6) header to generate the legacy (e.g., IPv4) destination address. This legacy (e.g., IPv4) destination address is illustrated in 512.

In step 503 the second lowest 32 bits of the new (e.g., IPv6) destination address (i.e., bits 64:33) are extracted to determine if they are zero or nonzero values. Non-zero values may indicate that the packet is a reply packet, and that these bits contain the local legacy (e.g., IPv4) address assigned in local network 204 for identifying the device in network 202 A/B sending the new (e.g., IPv6) packet. When the values are non-zero, the process proceeds to step 510 where the second lowest 32 bits of the new (e.g., IPv6) destination address (i.e., bits 64:33) are concatenated to the extracted lowest 32 bits of the new (e.g., IPv6) destination address to form the translated legacy (e.g., IPv4) destination and source address, respectively, as illustrated in 516.

If in step 503 the second lowest 32 bits of the new (e.g., IPv6) destination address (i.e., bits 64:33) are zero, the new (e.g., IPv6) packet may have been externally initiated (i.e., not a reply packet). In other variations, the second lowest 32 bits may use a different designated value other than zero to indicate that the new (e.g., IPv6) packet may be externally initiated (e.g., 0.0.0.1). If the second lowest 32 bits of the new (e.g., IPv6) destination address is zero (or other specific designated value), the stateless translator performs in step 504 a reverse quad-A DNS lookup of the new (e.g., IPv6) source address to acquire the source domain name (e.g., vod1.philly.provider.com), as illustrated in 514. The reverse DNS lookup may be queried from a DNS having lookup tables populated with data that maps to the same new (e.g., IPv6) network address space where the source device is located, so that the correct domain name for the source is retrieved. The DNS may for example be 206A in the new (e.g., IPv6) network 202A or 206B in the new (e.g., IPv6) network 202B. Additionally or alternatively, a DNS may be, for example, DNS 206C in the legacy (e.g., IPv4) network 204, if the DNS is configured to handle new (e.g., IPv6) queries, and the DNS mapping table has been populated with the new (e.g., IPv6) address. A reverse DNS lookup query may also include other information identifying the source, such as a UDP destination port.

In step 505, a forward (e.g., "A" record) DNS lookup of the destination domain name retrieved in step 504 may be performed to acquire the legacy (e.g., IPv4) source address for the new (e.g., IPv6) sending device. This query is illustrated in 515. The DNS lookup query may be to a DNS populated with data that maps to the local legacy (e.g., IPv4) network address space where the destination device is located (e.g., 204), so that the correct addresses for the destination is retrieved. The DNS may for example be 206C in legacy (e.g., IPv4) network 204. Additionally or alternatively, a DNS may be, for example, DNS 206A if the legacy (e.g., IPv4) destination address is a global address that is unique across networks 202A and 204.

In step 506, the legacy (e.g., IPv4) source address obtained in step 505 is concatenated to the lowest 32 bits of the new (e.g., IPv6) destination address to form the legacy (e.g., IPv4) destination and source address of the legacy (e.g., IPv4) header, as shown in 516.

In step 507, the UDP destination and source ports are extracted from the new (e.g., IPv6) extended header and concatenated to the legacy (e.g., IPv4) destination and source address to form the legacy (e.g., IPv4) address and UDP port fields of the legacy (e.g., IPv4) header, as shown in 517.

In step 508, the new (e.g., IPv6) payload may be concatenated to the legacy (e.g., IPv4) header to generate the legacy (e.g., IPv4) packet, as shown in 518. In some examples, step 508 may also include generating other legacy (e.g., IPv4) header information (not shown). In step 509, the completed legacy (e.g., IPv4) translated packet is forwarded to the legacy (e.g., IPv4) destination device.

Returning to step 501, the received new (e.g., IPv6) packet may have been sent by the new (e.g., IPv6) sending device as an original message that was not in response to a packet being received. In this scenario, the sending device did not receive a packet from which to generate a destination address. In such a case, various embodiments include dynamic DNS support to enable the new (e.g., IPv6) source device to retrieve a new (e.g., IPv6) destination address in the network 202A/B address space for the destination device in the legacy (e.g., IPv4) network. To support dynamic DNS (DDNS), the network operator, via the stateless translator or other server device on the network, may register well-known information for each legacy (e.g., IPv4) receiving device (e.g., UE 205), and map that information to a new (e.g., IPv6) address that will be routed to the stateless translator.

For example, in some variations, serial numbers, MAC addresses (e.g., MAC.00C0.1AB5.F117.STB.PROVIDER.COM), or other identifying information may be used in a fully qualified domain name (FQDN) for each destination device connected to the legacy (e.g., IPv4) local network (e.g., UE 205). Each FQDN or other identifying information may be stored in a database and have associated therewith, a local legacy (e.g., IPv4) address, and a specific stateless translator (e.g., XLATR 203B) through which the destination devices messages will be translated when routing between the new (e.g., IPv6) network and the legacy (e.g., IPv4) network. In one variation, a database may associate the FQDN MAC.00C0.1AB5.F117.STB.PROVIDER.COM, with the legacy (e.g., IPv4) address 10.1.1.1 for user equipment 205, and with the new (e.g., IPv6) prefix address of 2001:100:: for stateless translator 203B. These associations may be retrieved by a server device on one of the networks and registered with the DNS (e.g., 206A, 206B), such that an "AAAA" DNS lookup query to MAC.00C0.1AB5.F117.STB.PROVIDER.COM returns a new (e.g., IPv6) destination address 2001:100::A01:101. The high 64 bits of the new (e.g., IPv6) address include the new (e.g., IPv6) prefix address of the stateless translator (e.g., 2001:100::), and the low 64 bits includes 32 zeros concatenated with the legacy (e.g., IPv4) address of the destination device written in hexadecimal form (e.g., ::A01: 101 (0.0.0.0.10.1.1.1 dot decimal form)).

In one variation, a server or other device connected to the new (e.g., IPv6) or legacy (e.g., IPv4) network may store only FQDN/IPv4 address associations for one or more devices on the legacy (e.g., IPv4) network, and send these associations to the stateless translator. The stateless translator may then add its own new (e.g., IPv6) network prefix address to each association, and registers the FQDN/IPv6 (prefix)/IPv4 association with the DDNS on behalf of the legacy (e.g., IPv4) devices. In another variation, a device maintaining FQDN/IPv4 associations may query the stateless translator for its new (e.g., IPv6) network prefix information, and then perform the registering of the FQDN/IPv6 (prefix)/IPv4 associations with the DDNS. In a further variation, a server device on the new (e.g., IPv6) network may maintain a static mapping of the FQDN/IPv6(prefix)/ IPv4 associations for multiple local legacy (e.g., IPv4) networks/stateless translators, and proxy all DDNS registrations locally.

In some embodiments, the FQDN/IPv4 association may be obtained by querying various DNSs, routers, and network controller devices in the legacy (e.g., IPv4) network. For example, Address Resolution Protocol (ARP) table information that includes IPv4-to-MAC associations for one or more devices in the legacy (e.g., IPv4) network may be retrieved from a network controller in the legacy (e.g., IPv4) network.

Figure 6:
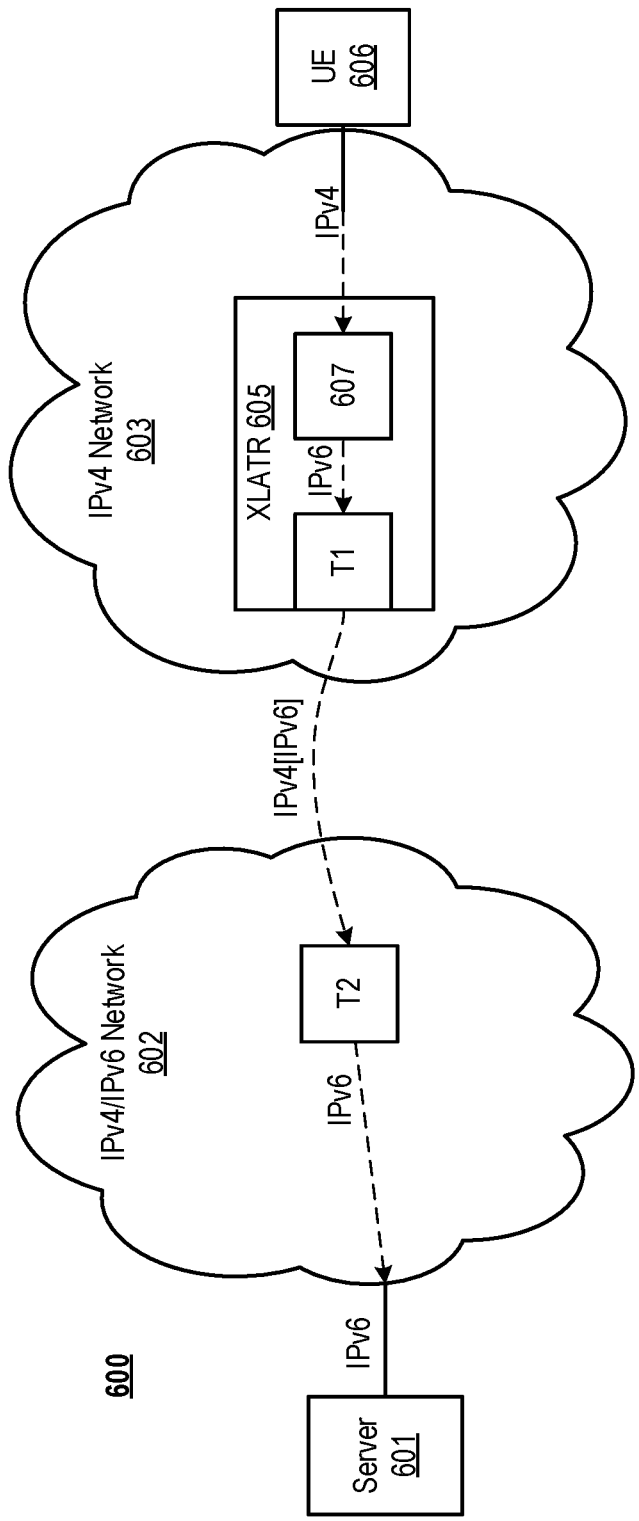
FIG. 6 illustrates an example network utilizing stateless translation with tunneling in accordance with one or more embodiments of the disclosure.

FIG. 6 illustrates an example embodiment of a global network 600 utilizing legacy/new protocol (e.g., Ipv4/IPv6) stateless translation with tunneling. In this embodiment, the stateless translator (XLATR) 605 may be included within the legacy (e.g., IPv4) only network 603. Translator 605 may include an embedded stateless translator as previously described (e.g., 203B, 203C) to output and receive new (e.g., IPv6) packets to/from legacy/new protocol (e.g., Ipv4/IPv6) network 602. However, since the legacy (e.g., IPv4) network 603 cannot route the new (e.g., IPv6) packets directly to and from the stateless translator, a tunneling function is included on the new (e.g., IPv6) interface of 607. In tunneling, the new (e.g., IPv6) packets are encapsulated in legacy (e.g., IPv4) packets. The new (e.g., IPv6) packets may be encapsulated directly within the legacy (e.g., IPv4) layer, or may be encapsulated within higher layers, such as within UDP packets, or within other upper level protocol packets. Encapsulating the new (e.g., IPv6) packets in UDP or other upper level protocol packets may allow the packets to be routed correctly across NAT devices, firewalls, gateways and routers when traversing multiple existing networks. For example, if a new (e.g., IPv6) packet is encapsulated within a UDP packet, then a NAT device may perform IP/Port translation without changing the embedded new (e.g., IPv6) packet. The tunneling may be performed between two endpoints, T1 in the legacy (e.g., IPv4) network and T2 in the new (e.g., IPv6) network. These endpoints can be at IP/UDP addresses predefined and configured by a network administrator and/or determined dynamically/automatically. In one example, the creation of a tunnel via tunnel brokering may be used to dynamically or statically create a tunnel over an existing IP network that is used to transport separate IP packets. IP packets of unlike or like IP address families can be transported over the created tunnels. Tunnel creation can be between hosts, routers, or a combination of the same, or other devices.

In the previous examples, the stateless translator accessed DNSs in the legacy (e.g., IPv4) and new (e.g., IPv6) networks. In the embodiment of FIG. 6, since the stateless translator (XLATR) 605 is located entirely within the legacy (e.g., IPv4) network, the stateless translator may access the legacy (e.g., IPv4) DNSs and exchange messages with user equipment 606 directly. To access the new (e.g., IPv6) DNSs and server 601, the stateless translator 605 may send and receive messages through the tunnel between endpoints T1 and T2.

Figure 7:
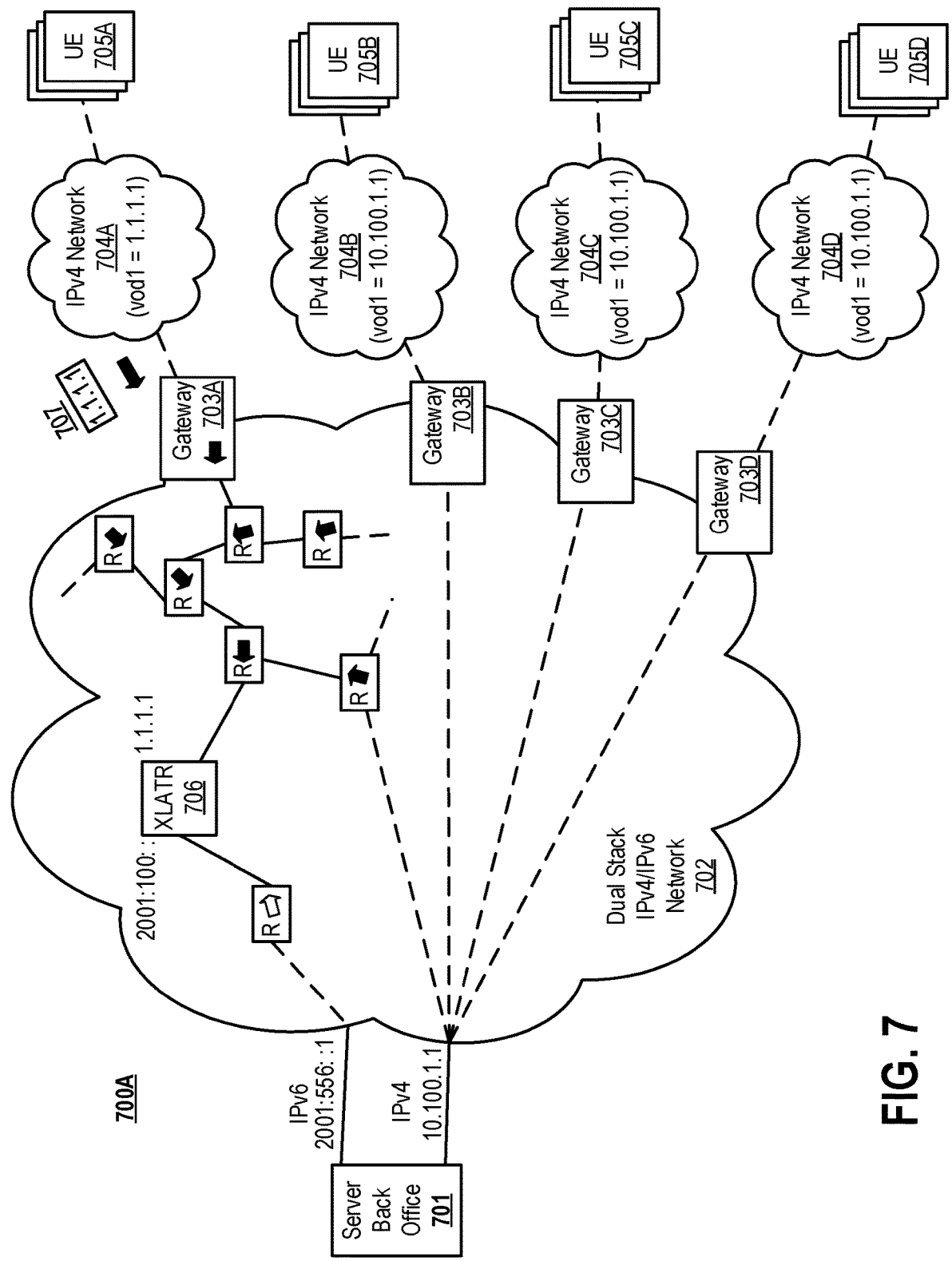
FIGS. 7-8 illustrate examples of an IPv4 network back-office migrated to an IPv6 network back-office utilizing stateless translation in accordance with one or more embodiments of the disclosure.
Figure 8:
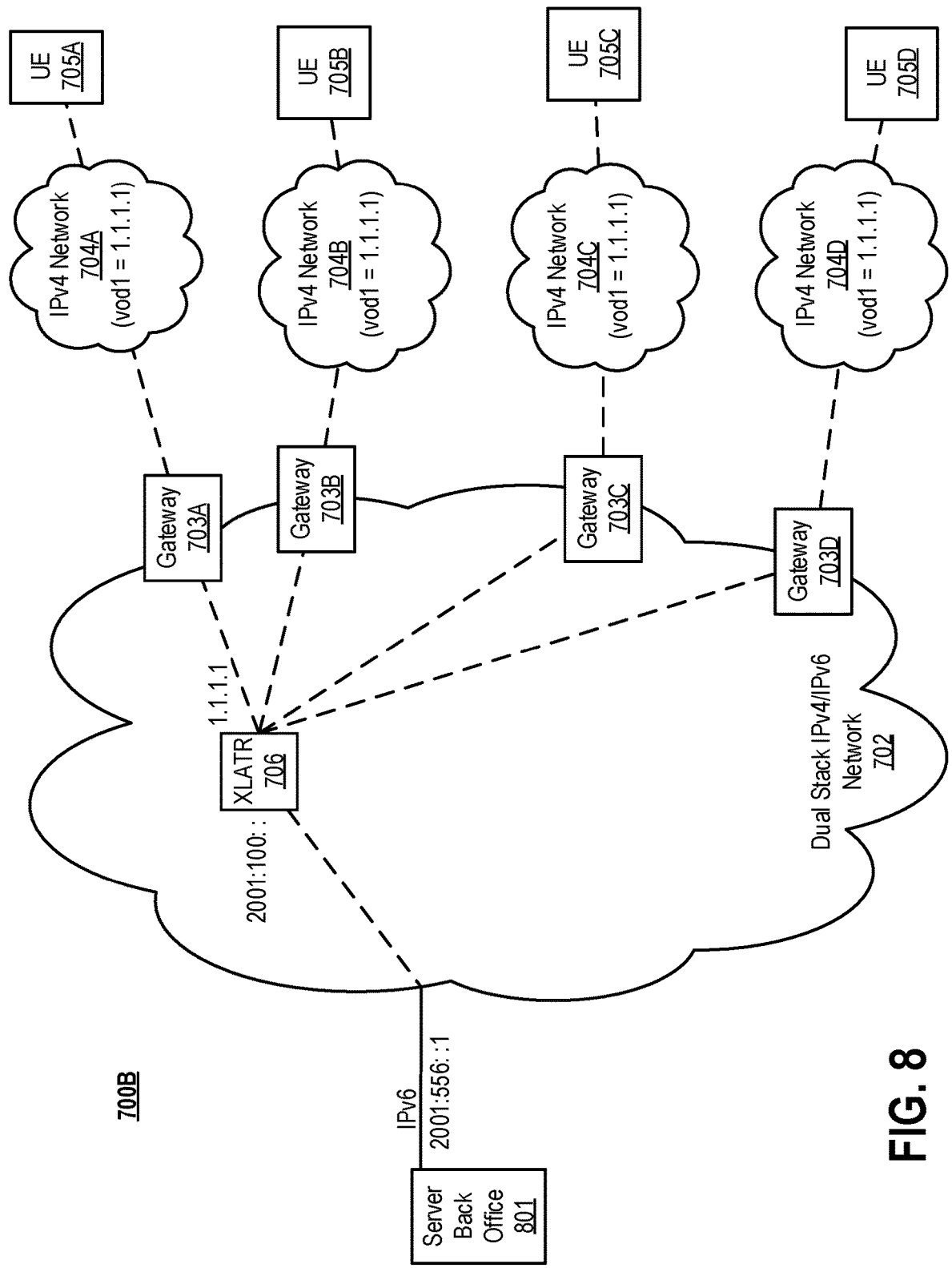

FIGS. 7-8 illustrate various examples of a legacy/new protocol (e.g., Ipv4/IPv6) server back office 701 migrated to a new (e.g., IPv6) only back office by incorporating legacy (e.g., IPv4) stateless translation in stages. As illustrated in FIG. 7, in this illustrative embodiment, a network backbone 702 may support legacy (e.g., IPv4) and new (e.g., IPv6), and may connect numerous legacy (e.g., IPv4) networks 704A-D through gateways or other router devices 703A-D. Legacy (e.g., IPv4) only networks 704A-D may connect numerous end devices, UEs 705A-D, and together with network 702, communicate data between the numerous end devices 705A-D and the server back office 701.

The server back office 701 may support both legacy (e.g., IPv4) and new (e.g., IPv6) data traffic. For simplicity, the server back office 701 is illustrated as a single server with one new (e.g., IPv6) interface (e.g., 2001:556::1) and one legacy (e.g., IPv4) interface (e.g., 10.100.1.1). However, the back office may include numerous servers having multiple legacy (e.g., IPv4) and new (e.g., IPv6) interfaces (e.g., addresses). In one variation, the networks together may form a video distribution network, and the servers may be video servers, which may provide video streaming or other video delivery services to the end devices. The end devices may be set top boxes or other similar devices.

In migrating the back-office servers to new (e.g., IPv6) only systems, while leaving the remaining network intact, the network operator may deploy stateless translators in stages, performing new (e.g., IPv6) translation for some end devices and/or legacy (e.g., IPv4) networks, and preserving legacy (e.g., IPv4) functionality for the remaining end devices and/or legacy (e.g., IPv4) networks. FIG. 7 illustrates such a configuration. End devices connected through one or more of the legacy (e.g., IPv4) networks 704B-D may communicate (e.g., transmit and receive packets) with the server back office 701 through one or more legacy (e.g., IPv4) interfaces. For these devices, the server back office domain name (e.g., vod1) may be mapped in each of the legacy (e.g., IPv4) networks 704B-D to a legacy (e.g., IPv4) address (e.g., 10.100.1.1). As illustrated, this address is a global address, which is the same for each of the legacy (e.g., IPv4) networks 704B-D and network 702. In other variations, each of the networks 704B-D may resolve the server back-office domain name to a different local address. In such a case, gateways 703B, 703C, and/or 703D may perform traditional NAT functions for routing messages between the back office and networks 704B-D.

FIG. 7 illustrates an example network 700A with legacy (e.g., IPv4) network 704A being migrated to a translator, which communicates through legacy/new protocol (e.g., Ipv4/IPv6) network 702 to the server back office 701 new (e.g., IPv6) interface. To migrate the legacy (e.g., IPv4) network (and the devices on the legacy (e.g., IPv4) network), a stateless translator (XLATR) 706 is configured in the dual stack legacy/new protocol (e.g., Ipv4/IPv6) network 702, and is assigned (e.g., registered in a DNS) and new (e.g., IPv6) prefix address (e.g., 2001:100::). The legacy (e.g., IPv4) network 704A may have previously been configured to resolve the server back office legacy (e.g., IPv4) address in the same manner as legacy (e.g., IPv4) networks 704B-D (e.g., vod1=10.100.1.1).

In one variation, legacy (e.g., IPv4) traffic from network 704A to the server back office 701 is redirected to the translator by introducing an alias legacy (e.g., IPv4) address for the server back office (e.g., 1.1.1.1). In the example of FIG. 7, server back office 701 would have two IP addresses, 10.100.1.1 and alias 1.1.1.1. The alias address would be known to UE 705A in sending a message to the server back office 701 and also known to the translator 706, however, server back office 701 may have no knowledge of the alias. Routing information may then be distributed to routers (e.g., blocks denoted with an "R"), gateways (e.g., 703A), and other network devices within the legacy (e.g., IPv4) portion of networks 702 and 704A, to instruct the devices to route packets having destination address 1.1.1.1 through translator (XLATR) 706. In one variation, the translator may send a message to a connected router identifying that messages to alias 1.1.1.1 are to be routed to the translator 706, at which point the alias address is terminated. In one variation, routing information may be distributed to the routers using the Open Shortest Path First (OSPF) protocol, which is an internal gateway protocol used for distributing such information. Other variations may use other or additional routing protocols, such as Routing Information Protocol Version 1 (RIP1), Version 2 (RIP2), and next generation (RIPng) Intermediate-System-To-Intermediate-System (IS-IS) protocol, Multi-Topologies IS-IS (MT IS_IS), Border Gateway Protocol (BGP), and other protocols. This distribution of routing information to direct traffic through the stateless translator may be used in any of the illustrative embodiments disclosed herein.

With the routing information distributed to the routing devices, an end device (e.g., 705A) in the legacy (e.g., IPv4) network may then use the alias legacy (e.g., IPv4) address when communicating with the server back office 701, and these messages would be routed through the stateless translator 706, based on the distributed routing information. For example, the routing of legacy (e.g., IPv4) packet 707 may traverse the gateways and routers following the solid directional arrows as illustrated in the router blocks, because the routing information instructed each of these routers/gateways to forward packets destined for address 1.1.1.1 through the network to arrive at translator 706.

In certain variations, to update the legacy (e.g., IPv4) address of the server back office to 1.1.1.1 for devices in network 704A, a DNS in the network 704A may be updated to map the domain name of the server back office 701 to the alias address (e.g., vod1=1.1.1.1) instead of the actual address (e.g., 10.100.1.1). To perform the update, the network operator, via the stateless translator or other server device on the network, may register the alias address with the DNS.

Just as messages from legacy (e.g., IPv4) network 704A to server back office 701 may be redirected through translator 706, messages originating from server back office 701 to an end device in legacy (e.g., IPv4) network 704A may also be redirected through translator 706.

In certain variations, a new (e.g., IPv6) address (e.g., 2001:100::XXXX) for each migrated end device in the legacy (e.g., IPv4) network 704A may be registered with a DNS in network 702. When the server back office 701 performs a DNS lookup of the end device, the new (e.g., IPv6) address is returned instead of, or in addition to, the end devices actual legacy (e.g., IPv4) address. The server back office 701, can then address messages to the end device using the new (e.g., IPv6) address. The new (e.g., IPv6) DNS address registration may be performed as discussed with respect to FIG. 5.

In order for the messages with the new (e.g., IPv6) addresses for the end devices in network 704A to be routed through the translator 706, routing information may be distributed to routers (e.g., blocks denoted with an "R"), gateways, and other network devices within the new (e.g., IPv6) portion of network 702, to instruct the network devices to route packets having destination address 2001: 100:: through translator 706. In one illustrative variation, routing information may be distributed to the routers using the MT IS-IS routing protocol. Other embodiments may use other or additional routing protocols such as RIP2, RIPng, and other protocols compatible with IPv6. With the routing information distributed, the new (e.g., IPv6) packets may traverse the networks following the outlined arrows to arrive at translator 706.

In certain variations, to migrate other legacy (e.g., IPv4) networks (e.g., 705B-D) to legacy/new protocol (e.g., Ipv4/IPv6) translation, the DNSs in the other networks may be updated in a similar manner. When all legacy (e.g., IPv4) networks are migrated, the legacy (e.g., IPv4) interface of the server back office 701 may be removed. FIG. 8 illustrates a completely migrated example network 700B, with the server back office upgraded to support only the new (e.g., IPv6) protocol.

Figure 9:
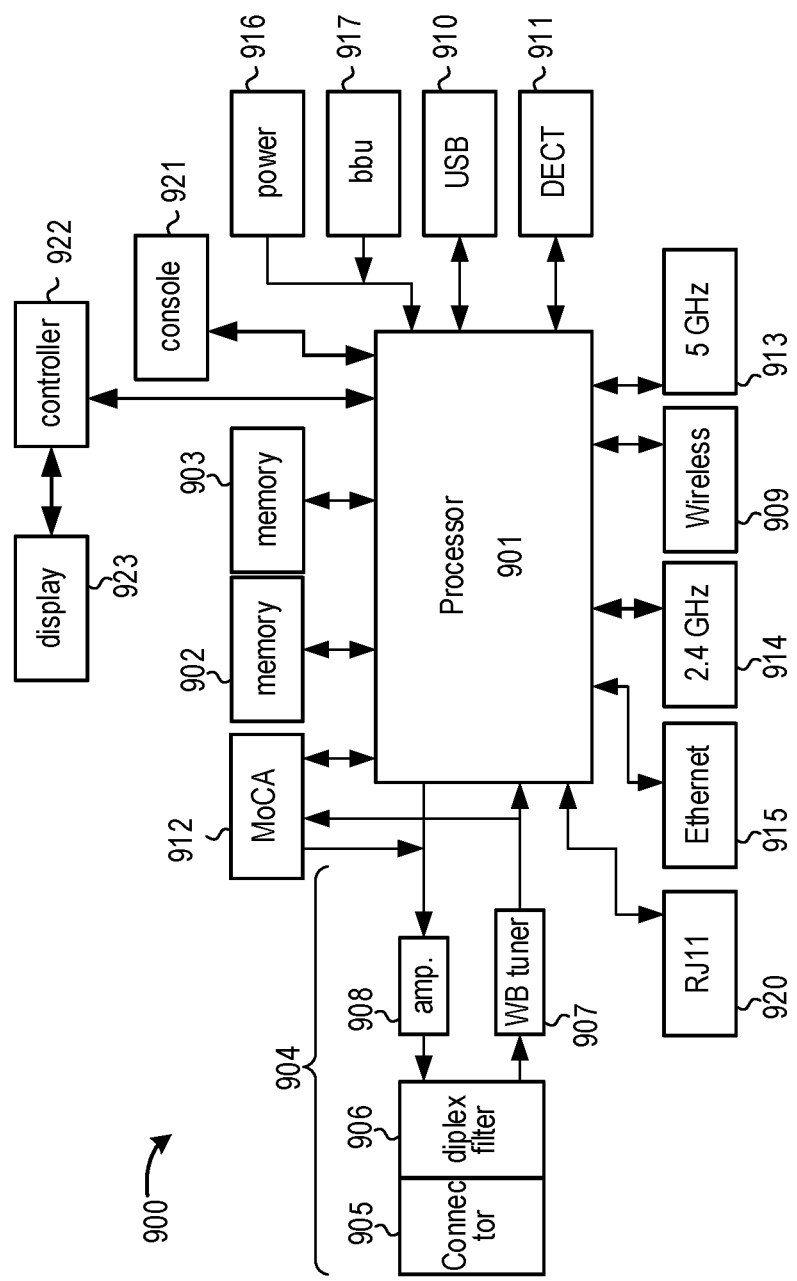
FIG. 9 is an example block diagram of a computing platform in accordance with one or more embodiments of the disclosure.

FIG. 9 is an example block diagram of equipment 900 in which the various disclosed embodiments may be implemented. A main processor 901 is configured to perform various Link, Internet, Transport, Application, or other communication stack-layer operations, and to control operation of other components of equipment 900. Processor 901 may be implemented with any of numerous types of devices, including but not limited to one or more general-purpose microprocessors, one or more application specific integrated circuits, one or more field programmable gate arrays, and combinations thereof. In at least some illustrative embodiments, processor 901 carries out operations described herein according to machine readable instructions (e.g. software, firmware, etc.) stored in memory 902 and 903 and/or stored as hardwired logic gates within processor 901. Processor 901 communicates with and controls memory 902 and 903 and other components within equipment 900 over one or more buses.

Main processor 901 communicates with networks or end devices across one or more RF/Optical interface transceivers 904 that may include a network interface connector 905 (e.g., coaxial cable connector, fiber-optic connecter, etc.), a diplex filter/circulator 906, a tuner (such as wideband (WB) tuner) 907, and an upstream communication amplifier 908. Main processor 901 may also communicate with the networks or end devices through various additional interfaces that include additional hardware and/or firmware. Such interfaces can include one or more USB interfaces 910, DECT interfaces 911, MOCA (Multimedia Over Coax) interfaces 912, 2.4 GHz Wi-Fi interfaces 914, 5 GHz Wi-Fi interfaces 913, other wireless interfaces 909, Ethernet interfaces 915, RJ11 interfaces 920, etc. A power supply 916 and/or battery backup (bbu) 917 may provide electrical power. User input to equipment 900 may be provided over one of the aforementioned interfaces or via a separate collection of buttons, infrared ports, or other controls in a console 921. Equipment 900 may include one or more output devices, such as a display 923 (or an external television), and may include one or more output device controllers 922, such as a video processor.

Memory 902 and 903 may include volatile and non-volatile memory and can include any of various types of storage technology, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. As used herein (including the claims), a tangible machine-readable storage medium is a physical structure that can be touched by a human. A signal would not by itself constitute a tangible machine-readable storage medium, although other embodiments may include signals or other ephemeral versions of instructions executable by one or more processors to carry out one or more of the operations described herein.

In at least some embodiments, each of the servers, stateless legacy/new protocol (e.g., Ipv4/IPv6) translators, NATs, network devices, gateways, user equipment, and other equipment, which perform the various described processes, can be implemented as a single computing platform or multiple computing platforms, such as multiple equipment 900, for redundancy and/or to increase the amount of analysis, data storage and other operations being performed simultaneously, or for convenience. Additionally, in various embodiments, multiple computing platforms may be configured to communicate over one or more networks to perform the various described processes of any single or multiple servers, user equipment or other equipment described above (e.g., cloud computing).

In the various illustrative embodiments described above, the communications between the servers and other described equipment may be accomplished through a group of networks, which are represented by clouds (e.g., 102, 104, 202A-B, 602, 603, 702, 704A-D). The networks represented by clouds may include a single network or combination of networks, including one or more private or public, local or wide area, networks and in-home networks, which may be wired and/or wireless. These may include, for example, coaxial, fiber, or hybrid fiber/coaxial distribution systems (e.g., a DOCSIS network), digital subscriber line (DSL) networks, a satellite communication networks, wireless and cellular networks, and/or a PBX networks, and combinations thereof. The networks may also include various routers, gateways, servers, antennas, repeaters, satellites, etc., for receiving and transmitting data through the network.

The networks may include a wide area wireless network providing mobile telephony and other types of mobile services to mobile user equipment, such as mobile telephones, "smart" phones, personal digital assistants (PDAs), laptops, electronic book readers, tablets, touchpad devices, and other types of wireless handheld devices. Examples of such wide area wireless networks include but are not limited to satellite and cellular telephone networks, 2G, 3G, 4G, etc. mobile networking and telecommunication networks, including CDMA, WCDMA, GSM, CDMA2000, TD-SCDMA, WiMAX, LTE solutions, EDGE (Enhanced Data rate for GSM Evolution) networks, EVDO (EVolution Data Optimized) networks, etc. The networks may further include, but are not limited to, such technologies as Bluetooth networks, femtocell technology, Digital Enhanced Cordless Telephone (DECT) networks, WiFi networks according to IEEE 802.11, Cordless Advanced Technology—Internet and Quality (CAT-iq) networks, Ethernet networks Multimedia Over Coax Alliance (MOCA) networks, Digital Living Network Alliance (DLNA) networks, etc.

While the network clouds are illustrated as a central network through which all devices communicate, the network clouds may comprise a number of separate networks, where only certain devices communicate with one another through a first network, while other devices communicate through a different network not connected to the first network.

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. All permutations of features from the above-described embodiments are within the scope of the invention.

For example, while the IPv4 and IPv6 protocols have been used herein as illustrative examples of how at least some of the disclosed embodiments may be practically applied various embodiments may be equally applied to other packet protocols that rely on source and destination addresses, and to other hardware and software platforms intended to serve similar routing functions of data using one or more packet protocols.

As another example, while some of the embodiments are illustrated with a single stateless translator, multiple translators may be used. Likewise, the functions performed by a single DNS as described above may be performed by multiple DNSs or DNS components. Certain variations may use the distribution of routing information as discussed with respect to FIG. 7, to control the routing and distribution of traffic to the multiple translators and multiple DNSs. As used herein, a single translator may refer generically to include multiple translators such as multiple translator servers performing the stateless translations as described herein. A DNS may refer to multiple DNSs such as multiple DNS servers performing the DNS operations as described herein.

As a further example, while the various embodiments have been described to include an IPv4 interface and an IPv6 interface, these interfaces could be a single network interface configured to transmit and receive both IPv4 and IPv6 data, or could be a plurality of network interfaces. The plurality of interfaces may each be configured to transmit and receive both IPv4 and IPv6 data, or one or more of the plurality of interfaces may be configured to transmit and receive only IPv4 or IPv6 data. Further one or more of the plurality of interfaces may be configured to transmit data only or to receive data only. As used herein (including the claims), a single network interface, unless stated otherwise, may refer generically to include any combination of one or more networks interfaces capable of transmitting and/or receiving IPv4 and/or IPv6 data traffic over one or more communicatively connected networks.

The invention claimed is:

1. A method comprising:
   receiving, from a network, a first packet comprising a first source address, a first destination address, and a data payload, wherein the first source address and the first destination address are formatted according to a first address format;
   extracting, from the first destination address, a second destination address formatted according to a second address format different from the first address format;
   sending, to a computing device, a query, based on the first source address, for a second source address formatted according to the second address format;
   receiving, from the computing device, the second source address formatted according to the second address format; and
   generating a second packet comprising the second source address, the second destination address, and the data payload.

2. The method of claim 1, wherein the computing device comprises a server,
   wherein sending the query comprises:
     sending, to the server, a first query based on the first source address;
     receiving, after sending the first query, an identifier from the server; and
     sending, to the server, a second query based on the identifier, and
   wherein receiving the second source address comprises:
     receiving, after sending the second query, the second source address.

3. The method of claim 2, wherein the first query to the server is a reverse lookup to a domain name system, and the second query is a forward lookup to the domain name system.

4. The method of claim 1, wherein the second packet further comprises a User Datagram Protocol source port identifier indicated in the first packet and a User Datagram Protocol destination port identifier indicated in the first packet.

5. The method of claim 1, wherein the first address format is an Internet Protocol version 6 address format and the second address format is an Internet Protocol version 4 address format.

6. The method of claim 1, wherein sending the query comprises:
   extracting a portion of a header of the first packet;
   evaluating the portion of the header of the first packet; and
   based on the evaluating, sending the query to the computing device.

7. The method of claim 6, wherein evaluating the portion of the header of the first packet comprises determining the portion matches a specific value.

8. The method of claim 1 further comprising:
   generating a map by mapping the first destination address to the second destination address; and
   storing the map in a database.

9. The method of claim 1, wherein the second destination address is associated with a stateless protocol translation device.

10. An apparatus comprising:
    one or more processors; and
    memory storing instructions that, when executed by the one or more processors, cause the apparatus to:

receive, from a network, a first packet comprising a first source address, a first destination address, and a data payload, wherein the first source address and the first destination address are formatted according to a first address format;

extract, from the first destination address, a second destination address formatted according to a second address format different from the first address format;

send, to a server, a query, based on the first source address, for a second source address formatted according to the second address format;

receiving, from the server and after sending the query to the server, the second source address formatted according to the second address format; and generate a second packet comprising the second source address, the second destination address, and the data payload.

11. The apparatus of claim 10, wherein, to send the query, the instructions, when executed by the one or more processors, cause the apparatus to:

send, to the server, a first query based on the first source address;

receive, after sending the first query, an identifier from the server; and send, to the server, a second query based on the identifier, and wherein, to receive the second source address, the instructions, when executed by the one or more processors, cause the apparatus to:

receive, after sending the second query, the second source address.

12. The apparatus of claim 11, wherein the first query to the server is a reverse lookup to a domain name system, and the second query is a forward lookup to the domain name system.

13. The apparatus of claim 10, wherein, to send the query, the instructions, when executed by the one or more processors, cause the apparatus to:

extract a portion of a header of the first packet;
evaluate the portion of the header of the first packet; and
based on the evaluation, send the query to the server.

14. The apparatus of claim 13, wherein, to evaluate the portion of the header of the first packet, the instructions, when executed by the one or more processors, cause the apparatus to determine the portion matches a specific value.

15. The apparatus of claim 10, wherein the instructions, when executed by the one or more processors, further cause the apparatus to:

generate a map by mapping the first destination address to the second destination address; and
store the map in a database.

16. A system comprising:
a translation system comprising:
one or more first processors; and
first memory storing first instructions that, when executed by the one or more first processors, cause the translation system to:

receive, from a network, a first packet comprising a first source address, a first destination address, and a data payload, wherein the first source address and the first destination address are formatted according to a first address format;

extract, from the first destination address, a second destination address formatted according to a second address format different from the first address format;

send, to a computing device, a query, based on the first source address, for a second source address formatted according to the second address format;

receive, from the computing device, the second source address formatted according to the second address format; and generate a second packet comprising the second source address, the second destination address, and the data payload; and a user device comprising:
one or more second processors; and
second memory storing second instructions that, when executed by the one or more second processors, cause the user device to receive the second packet.

17. The system of claim 16, wherein, to send the query, the first instructions, when executed by the one or more first processors, cause the translation system to:

extract a portion of a header of the first packet;
evaluate the portion of the header of the first packet; and
based on the evaluation, send the query to the computing device.

18. The system of claim 16, wherein the computing device comprises a server, wherein, to send the query, the first instructions, when executed by the one or more first processors, cause the translation system to:

send, to the server, a first query based on the first source address;

receive, after sending the first query, an identifier from the server; and send, to the server, a second query based on the identifier, and wherein, to receive the second source address, the first instructions, when executed by the one or more first processors, cause the translation system to:

receive, after sending the second query, the second source address.

19. The system of claim 18, wherein the first query to the server is a reverse lookup to a domain name system, and the second query is a forward lookup to the domain name system.

20. The system of claim 16, wherein the second packet further comprises a User Datagram Protocol source port identifier indicated in the first packet and a User Datagram Protocol destination port identifier indicated in the first packet.

* * * * *

UNITED STATES PATENT AND TRADEMARK OFFICE
CERTIFICATE OF CORRECTION

PATENT NO. : 10,587,512 B2
APPLICATION NO. : 15/589018
DATED : March 10, 2020
INVENTOR(S) : Brzozowski et al.

It is certified that error appears in the above-identified patent and that said Letters Patent is hereby corrected as shown below:

In the Specification

Column 2, Brief Summary. Line 38:
Please delete "Ipv4/IPv6)" and insert --IPv4/IPv6)--

Column 2, Brief Summary. Line 44:
Please delete "Ipv4/IPv6)" and insert --IPv4/IPv6)--

Column 2, Brief Summary. Line 58:
Please delete "Ipv4/IPv6)" and insert --IPv4/IPv6)--

Column 4, Brief Summary. Line 63-64:
Please delete "Ipv4/IPv6)" and insert --IPv4/IPv6)--

Column 5, Brief Summary. Line 16:
Please delete "Ipv4/IPv6)" and insert --IPv4/IPv6)--

Column 5, Brief Summary. Line 37:
Please delete "IPV/IPv6" and insert --IPv4/IPv6--

Column 10, Brief Summary. Line 43:
Please delete "Ipv4/IPv6)" and insert --IPv4/IPv6)--

Column 10, Brief Summary. Line 49:
Please delete "Ipv4/IPv6)" and insert --IPv4/IPv6)--

Column 11, Brief Summary. Line 23:
Please delete "Ipv4/IPv6)" and insert --IPv4/IPv6)--

Signed and Sealed this
Tenth Day of May, 2022

Katherine Kelly Vidal
*Director of the United States Patent and Trademark Office*

CERTIFICATE OF CORRECTION (continued)
U.S. Pat. No. 10,587,512 B2

Column 12, Brief Summary. Line 4:
Please delete "Ipv4/IPv6)" and insert --IPv4/IPv6)--

Column 12, Brief Summary. Line 8:
Please delete "Ipv4/IPv6)" and insert --IPv4/IPv6)--

Column 13, Brief Summary. Line 31-32:
Please delete "Ipv4/IPv6)" and insert --IPv4/IPv6)--

Column 14, Brief Summary. Line 29:
Please delete "Ipv4/IPv6)" and insert --IPv4/IPv6)--